(12) United States Patent
Abe et al.

(10) Patent No.: US 7,478,694 B2
(45) Date of Patent: Jan. 20, 2009

(54) SNOWMOBILE

(75) Inventors: Tomohisa Abe, Saitama (JP); Kozo Yamada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 338 days.

(21) Appl. No.: 11/129,379

(22) Filed: May 16, 2005

(65) Prior Publication Data
US 2005/0252705 A1  Nov. 17, 2005

(30) Foreign Application Priority Data
May 17, 2004 (JP) ............................. 2004-146722
May 17, 2004 (JP) ............................. 2004-146749

(51) Int. Cl.
B62M 27/02 (2006.01)
(52) U.S. Cl. ..................................................... 180/182
(58) Field of Classification Search ................ 180/182, 180/183, 184, 186, 190, 211, 309, 291
See application file for complete search history.

(56) References Cited

U.S. PATENT DOCUMENTS

| | | | | |
|---|---|---|---|---|
| 2,320,600 A * | 6/1943 | Howell | ....................... | 180/211 |
| 3,698,497 A * | 10/1972 | Bombardier | ................ | 180/190 |
| 3,779,327 A * | 12/1973 | Perreault | .................... | 180/190 |
| 3,810,518 A * | 5/1974 | Smale | ....................... | 180/68.1 |
| 3,882,948 A * | 5/1975 | Southiere | .................... | 180/190 |
| 5,533,585 A * | 7/1996 | Kawano et al. | ............. | 180/190 |
| 5,660,245 A * | 8/1997 | Marier et al. | ............... | 180/190 |
| 5,829,545 A * | 11/1998 | Yamamoto et al. | .......... | 180/190 |
| 5,996,717 A * | 12/1999 | Hisadomi | .................... | 180/182 |
| 6,032,754 A * | 3/2000 | Izumi et al. | .................. | 180/190 |
| 6,446,744 B2 | 9/2002 | Wubbolts et al. | | |
| 6,866,110 B2 * | 3/2005 | Mallette et al. | ............. | 180/183 |
| 7,048,293 B2 * | 5/2006 | Bedard | ........................ | 280/291 |
| 7,124,848 B2 * | 10/2006 | Girouard et al. | ............ | 180/184 |
| 2004/0182623 A1 * | 9/2004 | Morii et al. | ............... | 180/190 |
| 2005/0199432 A1 * | 9/2005 | Abe et al. | .................... | 180/190 |
| 2005/0199433 A1 * | 9/2005 | Abe et al. | .................... | 180/190 |
| 2005/0205318 A1 * | 9/2005 | Abe et al. | .................... | 180/186 |
| 2005/0241867 A1 * | 11/2005 | Abe et al. | .................... | 180/182 |

FOREIGN PATENT DOCUMENTS

| JP | 7-228288 A | | 8/1995 |
|---|---|---|---|
| JP | 10212940 A | * | 8/1998 |
| JP | 11070888 A | * | 3/1999 |

* cited by examiner

Primary Examiner—Joanne Silbermann
Assistant Examiner—Daniel Yeagley
(74) Attorney, Agent, or Firm—Birch, Stewart, Kolasch & Birch, LLP

(57) ABSTRACT

A snowmobile provided with skis and being steerable by a steering shaft, and being provided with a silencer on the front side of an engine. The steering shaft passes between the engine and the silencer and overlaps the silencer in side view. Flat step floors for a rider's feet are provided on lateral sides of a lower portion of a seat. Step bars for enabling positioning of the rider's feet are provided at front portions of the step floors. The step bars are each provided on the rear side relative to the step floor tip end and within 350 mm from a track belt drive shaft which is provided on the rear side of the engine. The resulting configuration of the snowmobile makes it possible to lay out the silencer close to the engine, affords excellent turning performance, and provides step floors for good foot holding properties.

20 Claims, 11 Drawing Sheets

SNOWMOBILE

CROSS-REFERENCE TO RELATED APPLICATION

The present application claims priority under 35 U.S.C. §119 to Japanese Patent Application Nos. 2004-146749 and 2004-146722, filed May 17, 2004.

BACKGROUND OF THE INVENTION

1. Field of the Invention

The present invention relates to a snowmobile capable of running on a snow field, with an engine as a drive source.

2. Description of Background Art

There have been made a variety of proposals as to the layout of apparatuses around an engine (the layout of a steering shaft and a silencer) in a snowmobile running by the power of the engine. See, for example Japanese Patent Laid-open No. Hei 7-228288.

FIG. 2 of Japanese Patent Laid-open No. Hei 7-228288 is a plan view showing the internal structure of a conventional snowmobile, in which symbol 1 denotes the snowmobile, symbol 14 denotes an engine, symbol 21 denotes a silencer, symbol 24 denotes an exhaust pipe, symbol 25 denotes a steering shaft, and symbol 26 denotes a steering handle.

In recent years, silencers have come to be larger and heavier for the purposes of configuring a 4-cycle engine and enhancing the silencing performance. When the silencer becomes larger and heavier, influences are exerted particularly on the turning performance, so that it becomes necessary to take it into account to maintain the left-right balance.

In Japanese Patent Laid-open No. Hei 7-228288, the silencer 21 is disposed on a lateral side of the vehicle body, so that if the silencer 21 is enlarged in size, it is impossible to secure a space in which to contain the silencer 21. Besides, when the silencer 21 is disposed on the front side, the silencer 21 would interfere with the steering shaft 25.

In connection with snowmobiles for running by the power of an engine, proposals have been made as to the step floors on which to put the rider's feet. See, for example, U.S. Pat. No. 6,446,744.

FIG. 28 of U.S. Pat. No. 6,446,744 is a perspective view of a vehicle body frame of a snowmobile according to the prior art.

The vehicle body frame is a member which comprises step floors 166, 168 on lateral sides of a lower portion of the frame, and comprises a plurality of anti-slip portions 426 (indicates plurality, here and hereinafter) on the surfaces of the step floors 166, 168.

FIG. 37 of U.S. Pat. No. 6,446,744 is a perspective view of the anti-slip portion, and is an enlarged illustration of one of the plurality of anti-slip portions 426.

The anti-slip portion 426 is composed of a projection portion 430, a rugged portion 432 provided at a tip end portion of the projection portion 430, a hole portion 428 provided adjacently to the projection portion 430, and a recessed portion 434 provided adjacently to the hole portion 428, and the rider's foot is placed on the rugged portion 432 to obtain an anti-slip effect.

However, since the step floor as a whole is a wide and flat structure, and leaves a room for improvement, for example, there is the problem that the optimum positioning of the foot is difficult to achieve when the rider rides in a standing pose.

SUMMARY AND OBJECTS OF THE INVENTION

One of the objects of the present invention is to provide a snowmobile in which a silencer can be disposed close to an engine and which is excellent in turning performance. A further object of the present invention is to provide a snowmobile comprising step floors good in foot holding property.

According to a first aspect of the present invention, a snowmobile is provided with skis disposed at front portions of a vehicle body, the skis being steerable by a steering shaft, an engine provided at a front portion of the vehicle body, and a silencer provided on the front side of the engine, wherein the steering shaft is passed between the engine and the silencer, and is so disposed as to overlap the silencer in side view.

With the first aspect of the present invention, the steering shaft is so disposed as to overlap the silencer in side view, so that the silencer can be disposed close to the engine, the vehicle body can be reduced in size on the front side, and the silencer can be disposed close to the center of gravity of the vehicle body.

As a result, concentration of mass can be achieved, and the steerability of the vehicle can be enhanced.

According to a second aspect of the present invention, the silencer is provided with a through-hole through which to pass the steering shaft.

With the second aspect of the present invention, the silencer is provided with a through-hole through which to pass the steering shaft, so that the steering shaft can be laid out while preventing the silencer and the steering shaft from interfering with each other. In addition, limitations as to the angle and position in laying out the steering shaft can be reduced.

As a result, the steering shaft can be easily laid out in the limited internal space of the snowmobile.

According to a third aspect of the present invention, the silencer is provided with a recessed portion through which to pass the steering shaft.

With the third aspect of the present invention, the silencer is provided with a recessed portion through which to pass the steering shaft, so that the steering shaft can be laid out while preventing the silencer and the steering shaft from interfering with each other. In addition, limitations as to the angle and position in laying out the steering shaft can be reduced.

As a result, the steering shaft can be easily laid out in the limited internal space of the snowmobile.

According to a fourth aspect of the present invention, the steering shaft is formed in a roughly rectilinear shape.

With the fourth aspect of the present invention, the steering shaft is formed in a roughly rectilinear shape, so that a pipe-like member or members suffice to constitute the steering shaft, and a reduction in the cost of the steering shaft can be contrived. In addition, the mounting operation can be readily carried out.

According to a fifth aspect of the present invention, the steering shaft is formed to be bendable through a universal joint.

With the fifth aspect of the present invention, the steering shaft is formed to be bendable through a universal joint, so that the layout of the steering shaft can be changed flexibly. Since the layout of the steering shaft can be changed flexibly, the position of a steering handle connected to the steering shaft can be set to an optimum position according to the physique or taste of the rider.

As a result, comfortableness in driving can be enhanced.

According to a sixth aspect of the present invention, the snowmobile is provided with an engine provided at a front portion of a vehicle body, a seat for seating the rider thereon provided on the rear side of the engine, and flat step floors provided on lateral sides of a lower portion of the seat for the rider to put his feet thereon, and step bars for enabling positioning of the rider's feet thereon are provided at front portions of the step floors.

With the sixth aspect of the present invention, the step bars enabling positioning of the rider's feet are provided at front portions of the step floors, so that foot holding property is good, and a favorable riding position can be attained. This gives an advantage that the positions of the rider's feet can be determined easily, even when the rider drives the vehicle in a standing pose.

According to a seventh aspect of the present invention the step bars are each provided on the rear side relative to the front end of the step floor and within 350 mm from a track belt drive shaft provided on the rear side of the engine.

With the seventh aspect of the present invention, the step bars are each provided on the rear side relative to the front end of the step floor and within 350 mm from the track belt drive shaft which is provided on the rear side of the engine.

Where the distance from the track belt drive shaft to the step bar exceeds 350 mm, the position of the step bar is so far from the track belt drive shaft that the position of the rider is on the rear side, with the result of dispersion of mass. Therefore, the step bars are each provided within 350 mm from the track belt drive shaft.

As a result, concentration of the vehicle body mass inclusive of the rider can be contrived, so that turning performance of the vehicle body can be enhanced.

According to an eighth aspect of the present invention the step bars are each provided on the rear side relative to the tip end of the step floor and within 290 mm from a steering handle grip center.

With the eighth aspect of the present invention, the step bars are each provided on the rear side relative to the tip end of the step floor and on the rear side of and within 290 mm from the steering handle grip center.

If the distance from the steering handle grip center to the step bar exceeds 290 mm, the position of the rider is on the rear side, and the mass inclusive of the rider is dispersed. Therefore, the step bars are each provided within 290 mm from the steering handle grip center.

As a result, concentration of the vehicle body mass can be contrived, so that turning performance of the vehicle body can be enhanced.

According to a ninth aspect of the present invention the step floors are each provided on the rear side of and within 250 mm from the tip end of the step floor.

With the ninth aspect of the present invention, the step bars are each provided on the rear side relative to and within 250 mm from the tip end of the step floor.

When the distance from the tip end of the step floor to the step bar exceeds 250 mm, the position of the rider is on the rear side, and the mass inclusive of the rider is dispersed. Therefore, the step bars are each provided within 250 mm from the tip end of the step floor.

As a result, concentration of the vehicle body mass can be contrived, and turning performance of the vehicle body can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A best mode for carrying out the present invention will be described below, based on the accompanying drawings. Incidentally, the drawings are to be looked at according to the posture of symbols. Besides, L is a subscript indicating the left as viewed from the driver, and R the right.

Figure 1:
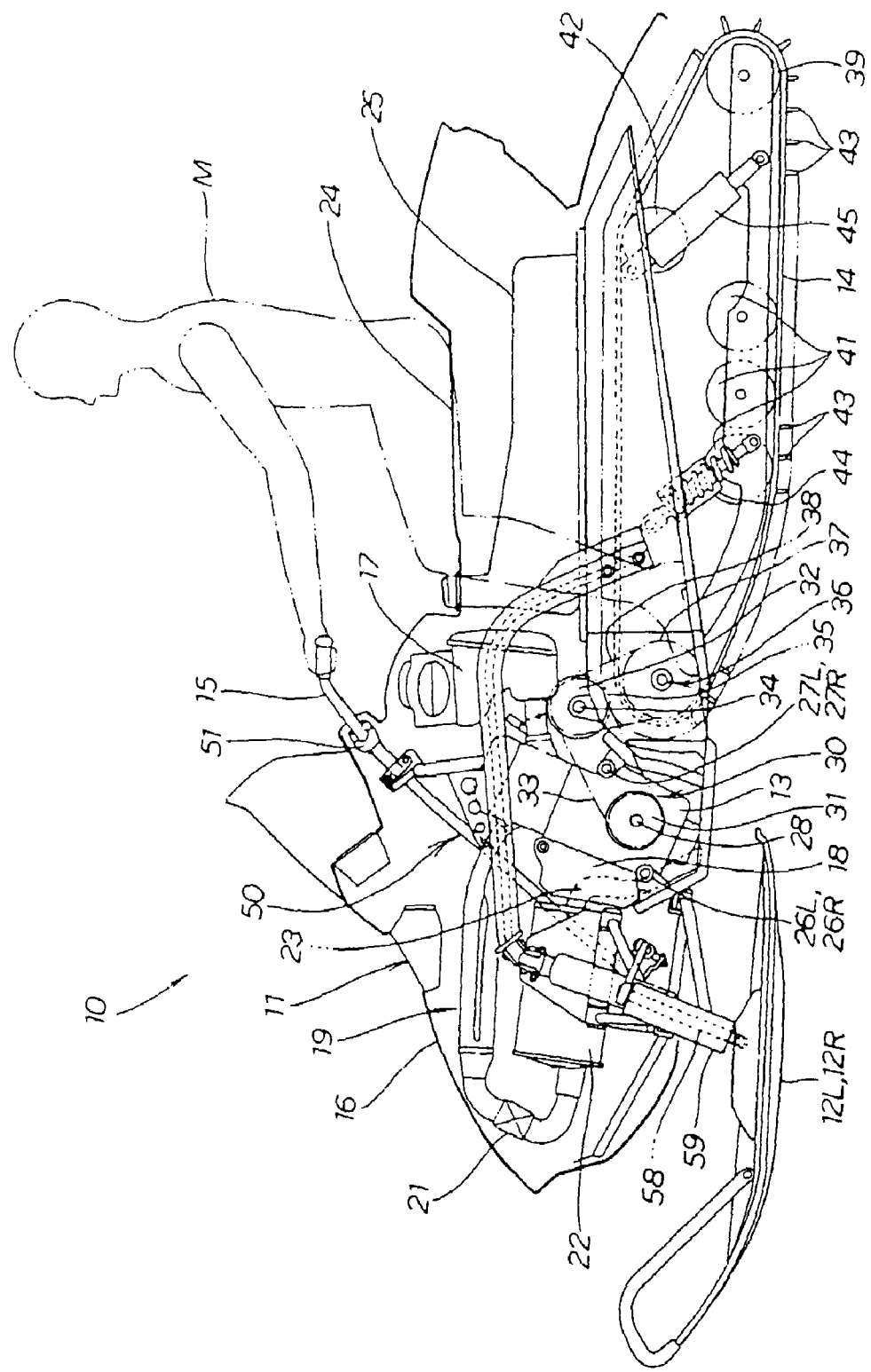
FIG. 1 is an overall side view of a snowmobile according to a first embodiment of the present invention.

FIG. 1 is an overall side view of a snowmobile according to a first embodiment of the present invention. The snowmobile 10 is a snow vehicle which comprises a left-right pair of skis 12L, 12R (12R is behind 12L, here and hereinafter), an engine 13 and a track belt 14 in this order from the front side toward the rear side of a vehicle body 11, which is made to run by driving the track belt 14 by the power of the engine 13, and in which the skis 12L, 12R can be steered by operating a steering handle 15.

A seat 24 on which to seat the rider is provided on the rear side of the engine 13 provided at a front portion of the vehicle body, and a fuel tank 25 is provided on the lower side of the seat 24 in the state of being elongate in the front-rear direction.

Symbols M denotes the rider, 16 denotes a vehicle body cover, 17 denotes an air cleaner, 18 denotes an oil tank, 19 denotes an exhaust pipe, 21 denotes a catalyst, 22 denotes a silencer, and 23 denotes a tail pipe. Incidentally, the configuration of a steering system will be described in detail referring to another drawing.

First, an intake/exhaust system will be described. Air sucked in through the air cleaner 17 flows into a combustion chamber of the engine 13. An exhaust gas generated upon combustion is discharged into the atmosphere through the exhaust pipe 19, the catalyst 21, the silencer 22 and the tail pipe 23.

The tail pipe 23, after extending out of the silencer 22, extends toward the depth of the drawing, and then extends downwards, whereby the exhaust gas is discharged to the outside of the vehicle.

The air cleaner 17 is disposed between the fuel tank 25 and the engine 13, so that inspection of the air cleaner 17 and replacement of an element can be easily carried out.

Next, a running system will be described. The engine 13 is mounted on the vehicle body frame through engine hangers 26L, 26R, 27L, 27R, and a drive pulley 31 is fitted over a crankshaft 28 of the engine 13.

A CVT belt 33 is wrapped around the drive pulley 31 and a driven pulley 32 disposed under the air cleaner 17, to constitute a belt type non-stage transmission 30. A cross shaft 34 for supporting the driven pulley 32 is extended toward the depth of the drawing, a sprocket 35 is attached to the tip end of the cross shaft 34, and a chain 38 is wrapped around the sprocket 35 and a sprocket 37 annexed to a drive wheel 36.

The power of the engine 13 is transmitted sequentially through the drive pulley 31, the CVT belt 33, the driven pulley 32, the cross shaft 34, the sprocket 35, and the chain 38 to the sprocket 37, whereby the drive wheel 36 can be rotated forwards or reversely.

The track belt 14 is wrapped around the drive wheel 36 disposed at a front portion, a driven wheel 39 disposed at a rear portion, a plurality of rotatable wheels 41 disposed at intermediate lower portions, and an idler 42 disposed at an upper portion, and projections 43 provided on the outside surface of the track belt 14 are made to bite into a snow surface, whereby the snowmobile 10 is made to run. Vertical movements generated at the time of riding over recesses and projections on the snow surface are absorbed by rear cushions 44, 45.

Thus, the snowmobile 10 has a structure in which the skis 12L, 12R disposed at front portions of the vehicle body can be steered by a steering shaft 50, the engine 13 is provided at a front portion of the vehicle body, and the silencer 22 is provided on the front side of the engine 13.

The steering shaft 50 is passed between the engine 13 and the silencer 22, and is so disposed as to overlap the silencer 22 in side view.

The steering shaft 50 is formed in a roughly rectilinear shape, so that a pipe-like member or members can be sufficiently used for constituting the steering shaft 50, and a reduction in cost of the steering shaft 50 can be contrived. In addition, a mounting work for the steering shaft 50 can be carried out readily.

Figure 2:
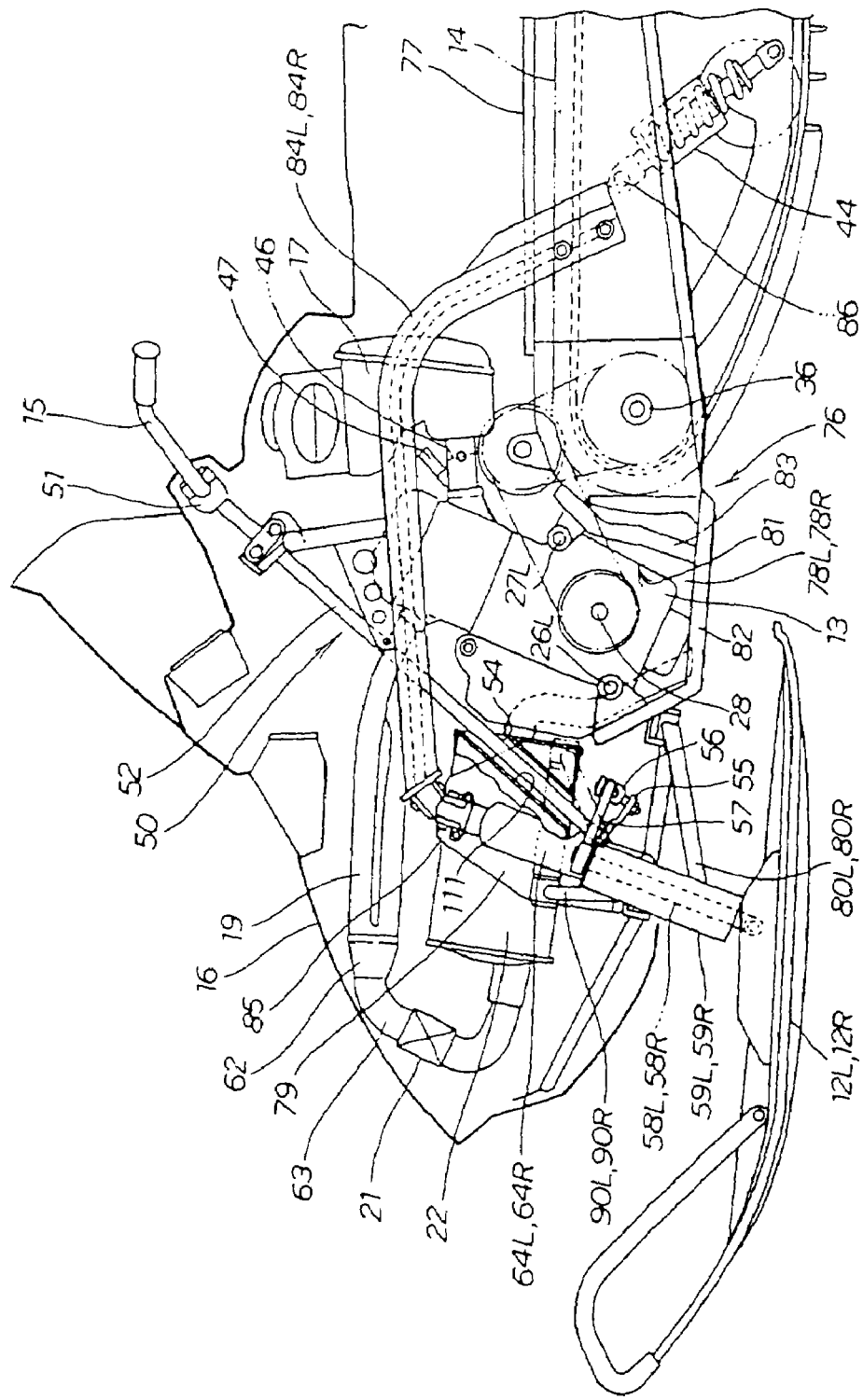
FIG. 2 is a side view of a front portion of the snowmobile according to the first embodiment of the present invention.

FIG. 2 is a side view of a front portion of the snowmobile according to the first embodiment of the present invention. The steering handle 15 and the skis 12L, 12R are connected to each other by use of the steering shaft 50 which will be described next and links.

The steering shaft 50 is composed of a steering shaft upper portion 52 provided at its upper end with a steering handle holder 51 and inclined forwardly downwards, and a steering shaft lower portion 54 extended to the lower side of the steering shaft upper portion 52.

Incidentally, symbol 46 denotes a throttle valve provided on the downstream side of the air cleaner 17, and 47 denotes an injector provided on the downstream side relative to the throttle valve 46.

A lever 55 is provided at the lower end of the steering shaft lower portion 54, a drive member 56 extended in the vehicle width direction (the face-back direction of the drawing) is connected to the lever 55, levers 57 are attached respectively to the left and right ends of the drive member 56, and vertically directed spindles 58L, 58R are rotated around roughly vertical axes by the levers 57, whereby the skis 12L, 12R can be steered.

Incidentally, the spindles 58L, 58R are rotatably contained in front leg portions 59L, 59R vertically movably supported by lower arms 80L, 80R vertically movably mounted to the vehicle body frame, upper arms 90L, 90R and front suspensions 64L, 64R.

Besides, the silencer 22 is disposed on the front side (the left side in the figure) of the engine 13, and the steering shaft lower portion 54 of the steering shaft 50 is passed between the silencer 22 and the engine 13 and is so disposed as to overlap the silencer 22.

The engine 13 is disposed on the rear side relative to the steering shaft lower portion 54. Since the steering shaft lower portion 54 is thus disposed on the front side of the engine 13, the engine 13 can be easily moved toward the rear side.

Specifically, the silencer 22 is provided with a through-hole 111, and the steering shaft lower portion 54 of the steering shaft 50 is passed through the through-hole 111 and is attached to the lever 55.

Since the silencer 22 is provided with the through-hole 111 through which to pass the steering shaft 50, the steering shaft 50 can be laid out without any interference between the silencer 22 and the steering shaft 50, the silencer 22 can be displaced to the rear side into the proximity to the engine 13, whereby concentration of mass can be contrived.

In addition, in the case of laying out the steering shaft 50 in the limited internal space of the snowmobile, limitations as to the angle and position in laying out the steering shaft 50 can be reduced.

As a result, the steering shaft 50 can be easily laid out in the limited space inside the snowmobile.

In addition, since the steering shaft lower portion 54 is passed through the through-hole 111 piercing through the silencer 22, a reduction in the length of the steering shaft 50 can be easily achieved.

The vehicle body frame 76 is a frame in which intermediate frames 78L, 78R being U-shaped in side view are connected to front portions of a rear frame 77 being roughly U-shaped in section and opening downwards so as to be astride the upper surface and the left and right side surfaces of the track belt 14, and a front frame 79 is connected to front portions of the intermediate frames 78L, 78R, characterized in that the intermediate frame 78L, 78R are reinforced as will be described below.

The intermediate frames 78L, 78R are each a frame being U-shaped in side view and provided with a cutout portion 81 so that the crankshaft 28 and the like can be passed therethrough. Since the intermediate frames 78L, 78R are the U-shaped frames, it is desirable to reinforce them.

In view of this, an L-shaped reinforcement 82 and an I-shaped reinforcement 83 are annexed to the intermediate frames 78L, 78R along the cutout portions 81, whereby the cutout portions 81 are reinforced.

Furthermore, an upper portion of the front frame 79 and a front upper portion of the rear frame 77 are connected to each other by side frames 84L, 84R disposed astride the cutout portions 81. Specifically, the front suspensions 64L, 64R are mounted to the front frame 79, and the tip ends of the side frames 84L, 84R are connected to the vicinity of a suspension receiving portion 85 provided for the mounting. The rear cushion 44 is mounted to the rear frame 77, and the rear ends of the side frames 84L, 84R are connected to the vicinity of a cushion receiving portion 86 provided for the mounting.

As a result, the front frame 79 and the rear frame 77 can be coupled firmly.

Figure 3:
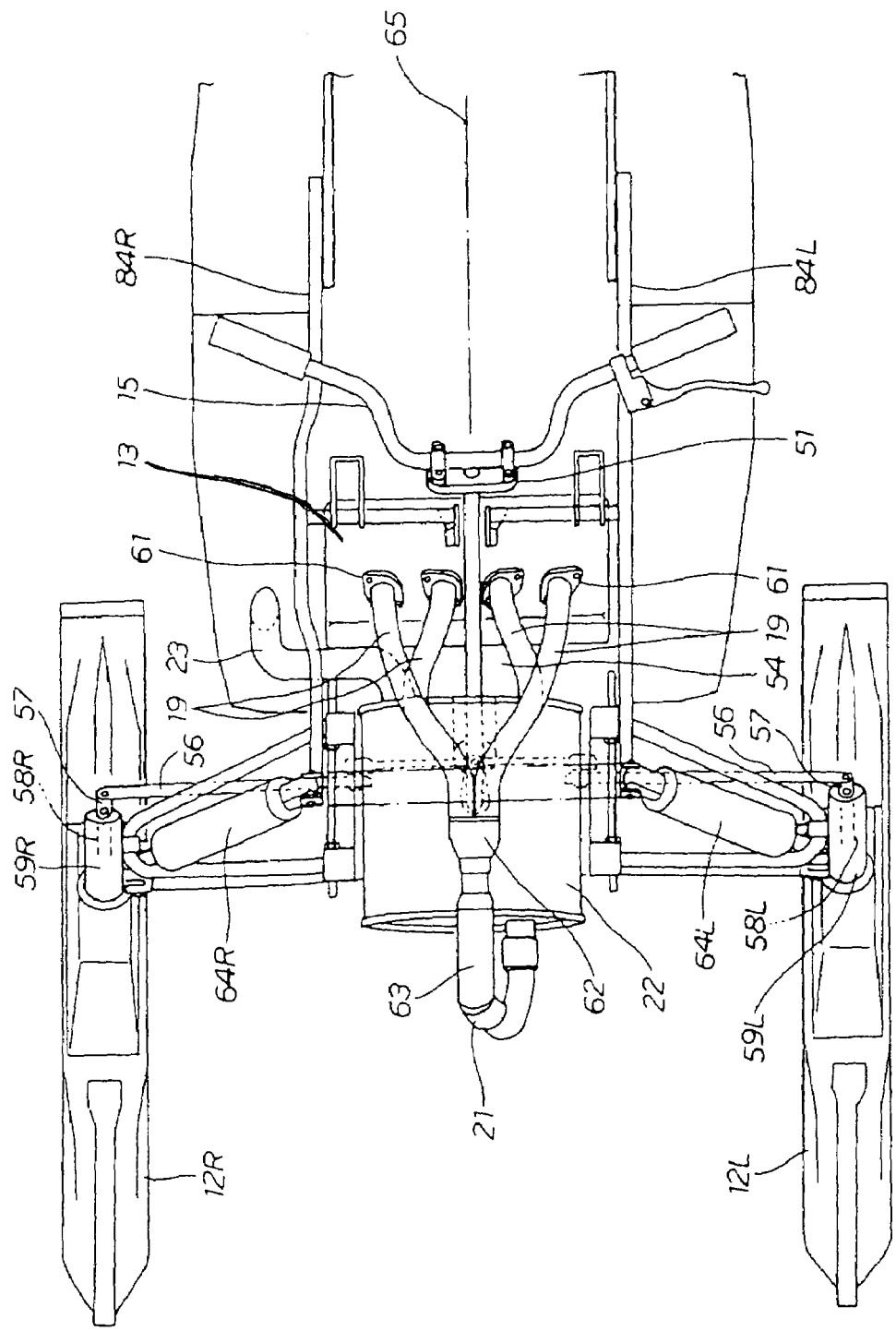
FIG. 3 is a plan view (a vehicle body cover is omitted) of a front portion of the snowmobile according to the first embodiment of the present invention.

FIG. 3 is a plan view (the vehicle body cover is omitted) of a front portion of the snowmobile according to the first embodiment of the present invention. The engine 13 is a 4-cycle series type 4-cylinder engine in this embodiment, with a crankshaft disposed to extend in the vehicle width direction and with exhaust ports 61 (indicates plurality, here and hereinafter) directed forwards.

Exhaust pipes 19 are extended respectively from the exhaust ports 61, and are connected into one pipe at an exhaust pipe manifold portion 62. One exhaust manifold pipe 63 is extended forwards from the outlet of the exhaust pipe manifold portion 62, is then bent back in U shape, and is connected to a front portion of the silencer 22.

The left and right front suspensions 64L, 64R are disposed on the left and right sides of the silencer 22.

As is clear from the figure, the silencer 22 is laid out with its longitudinal axis set parallel to the longitudinal axis of the vehicle body (the axis equivalent to the vehicle width center axis 65), so that the length of the silencer 22 does not exert any influence on the vehicle body width.

In addition, the silencer 22 having no influence on the vehicle body width is laid out between the left and right front suspensions 64L and 64R, which makes it possible to adopt a slim vehicle body and to reduce the size of the vehicle body.

Besides, since the silencer 22 is disposed on the front side of the engine 13, the silencer 22 can be disposed on the vehicle body center axis 65 or in the vicinity of the vehicle width center axis 65. As a result, the left-right balance can be easily equalized, and turning performance can be enhanced.

Furthermore, the steering shaft 50 is passed between the adjacent exhaust pipes 19, 19. As a result, a dead space 66 inevitably generated between the adjacent exhaust pipes 19, 19 can be converted into an, effective space.

Returning to FIG. 2, the exhaust pipes 19 and the exhaust pipe manifold portion 62 are passed over the silencer 22. Namely, the silencer 22 is laid out under the exhaust pipes 19.

The silencer 22 in recent years is comparatively large and heavy. When the silencer 22 thus being a heavy body can be disposed at a low position, a lowering in center of gravity of the vehicle body can be promoted.

The vehicle body frame 76 is a frame having a structure in which the intermediate frames 78L, 78R being U-shaped in side view are connected to front portions of the rear frame 77 being roughly U-shaped in section and opening downwards so as to be astride the upper surface and the left and right side surfaces of the track belt 14, and the front frame 79 is connected to front portions of the intermediate frames 78L, 78R, characterized in that the intermediate frame 78L, 78R are reinforced as will be described below.

The intermediate frames 78L, 78R are each a frame being U-shaped in side view and provided with the cutout portion 81 so that the crankshaft 28 and the like can be passed therethrough. Since the intermediate frames 78L, 78R are the U-shaped frames, it is desirable to reinforce them.

In view of this, the L-shaped reinforcement 82 and the I-shaped reinforcement 83 are annexed to the intermediate frames 78L, 78R along the cutout portions 81, whereby the cutout portions 81 are reinforced.

Furthermore, an upper portion of the front frame 79 and a front upper portion of the rear frame 77 are connected to each other by side frames 84L, 84R disposed astride the cutout portions 81. Specifically, the front suspensions 64L, 64R are mounted to the front frame 79, and the tip ends of the side frames 84L, 84R are connected to the vicinity of a suspension receiving portion 85 provided for the mounting. The rear cushion 44 is mounted to the rear frame 77, and the rear ends of the side frames 84L, 84R are connected to the vicinity of a cushion receiving portion 86 provided for the mounting.

The portions between the upper ends of the front suspensions 64L, 64R supporting the skis and front portions of the rear cushion 44 supporting the track belt 14 are reinforced with side frames 84L, 84R being protuberant to the upper side and being bent downwards. The side frames 84L, 84R can be detachably attached to the vehicle body frame 76.

By the side frames 84L, 84R, the front frame 79 and the rear frame 77 can be firmly connected to each other.

Figure 4:
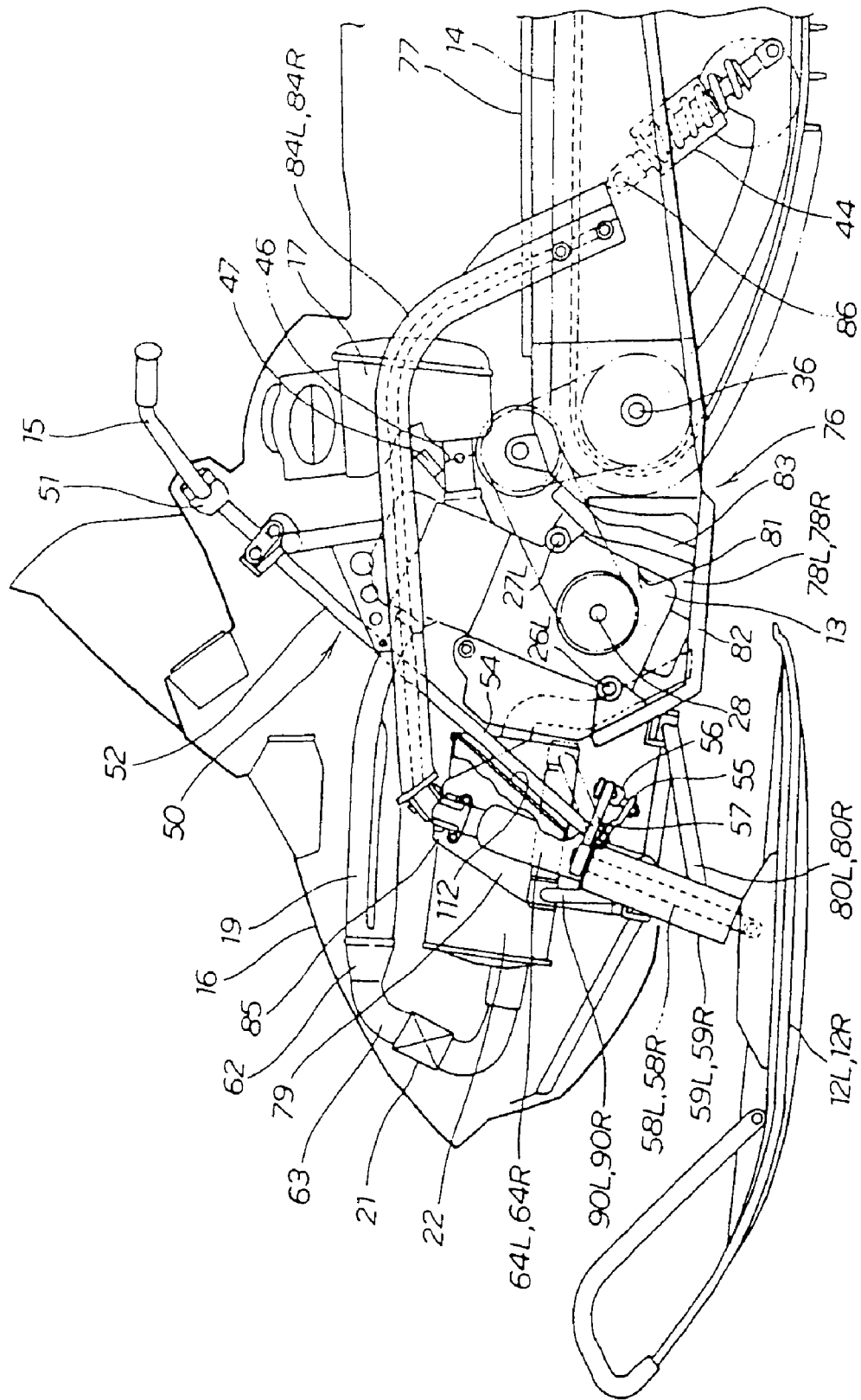
FIG. 4 is a side view of a front portion of a snowmobile according to a second embodiment of the present invention.

FIG. 4 is a side view of a front portion of a snowmobile according to a second embodiment of the present invention, and is different from FIG. 2 in that the silencer 22 is provided with a recessed portion 112 as a substitute for the through-hole, and the steering shaft lower portion 54 is passed through the recessed portion 112.

Since the silencer 22 is provided with the recessed portion 112 through which to pass the steering shaft 50, the steering shaft 50 can be laid out without any interference between the silencer 22 and the steering shaft 50.

In addition, in the case of laying out the steering shaft 50, limitations as to the angle and position in laying out the steering shaft 50 can be reduced.

As a result, the steering shaft 50 can be easily laid out in the limited internal space of the snowmobile.

Figure 5:
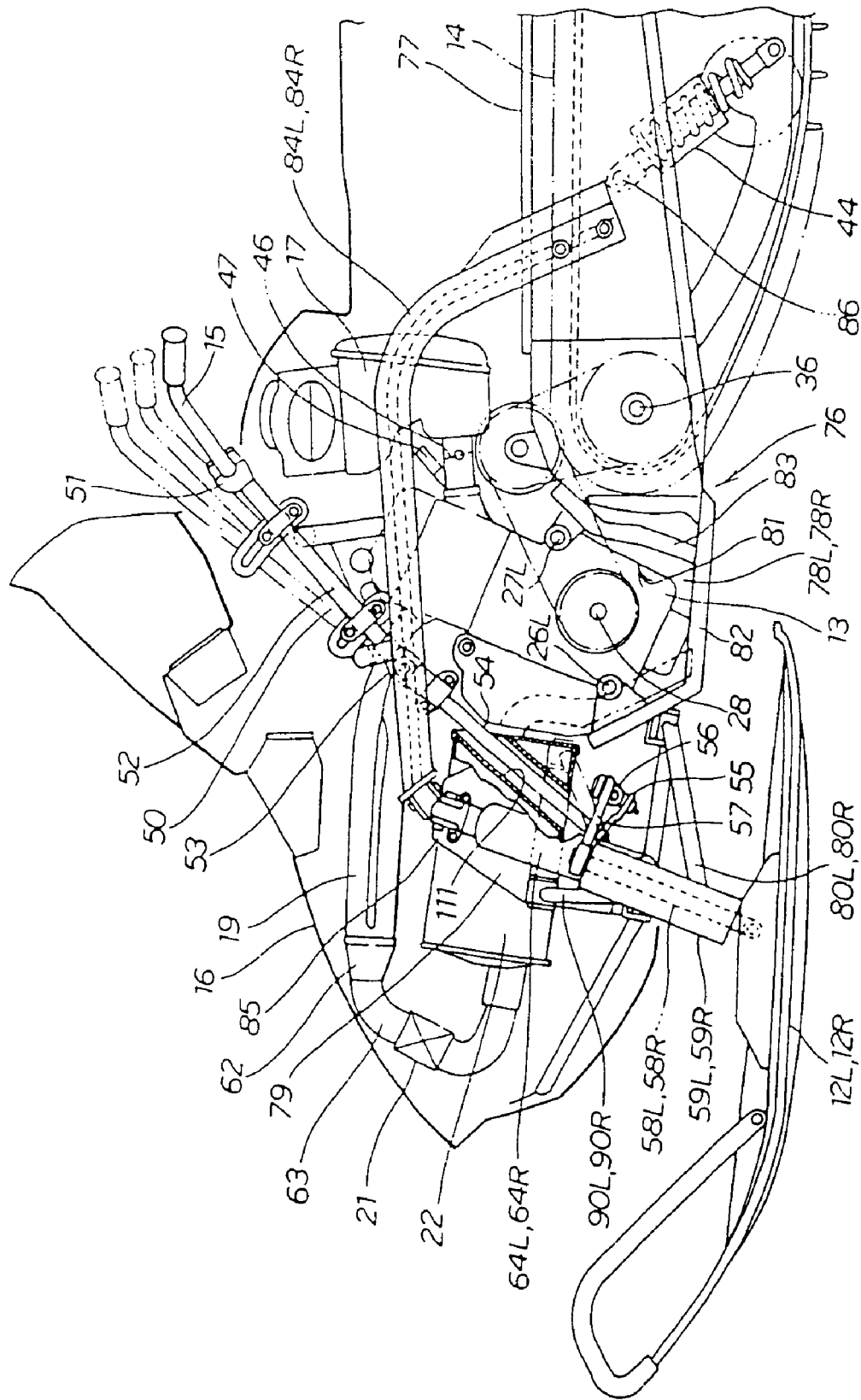
FIG. 5 is a side view of a front portion of a snowmobile according to a third embodiment of the present invention.

FIG. 5 is a side view of a front portion of a snowmobile according to a third embodiment of the present invention, and is different from FIG. 2 in that the steering shaft 50 is composed of a steering shaft upper portion 52 provided at its upper end with a steering handle holder 51 and inclined forwardly downwards, a universal joint 53 mounted to the lower end of the steering shaft upper portion 52, and a steering shaft lower portion 54 extended substantially vertically downwards from the universal joint 53. In other words, the universal joint 53 is added between the steering shaft upper portion 52 and the steering shaft lower portion 54.

Since the steering shaft 50 is formed to be bendable through the universal joint 53, the layout of the steering shaft 50 can be modified flexibly.

Since the layout of the steering shaft 50 can be modified flexibly, the position of the steering handle 15 connected to the steering shaft 50 can be set to an optimum position according to the physique and taste of the rider.

As a result, comfortableness in driving can be enhanced.

Figure 6:
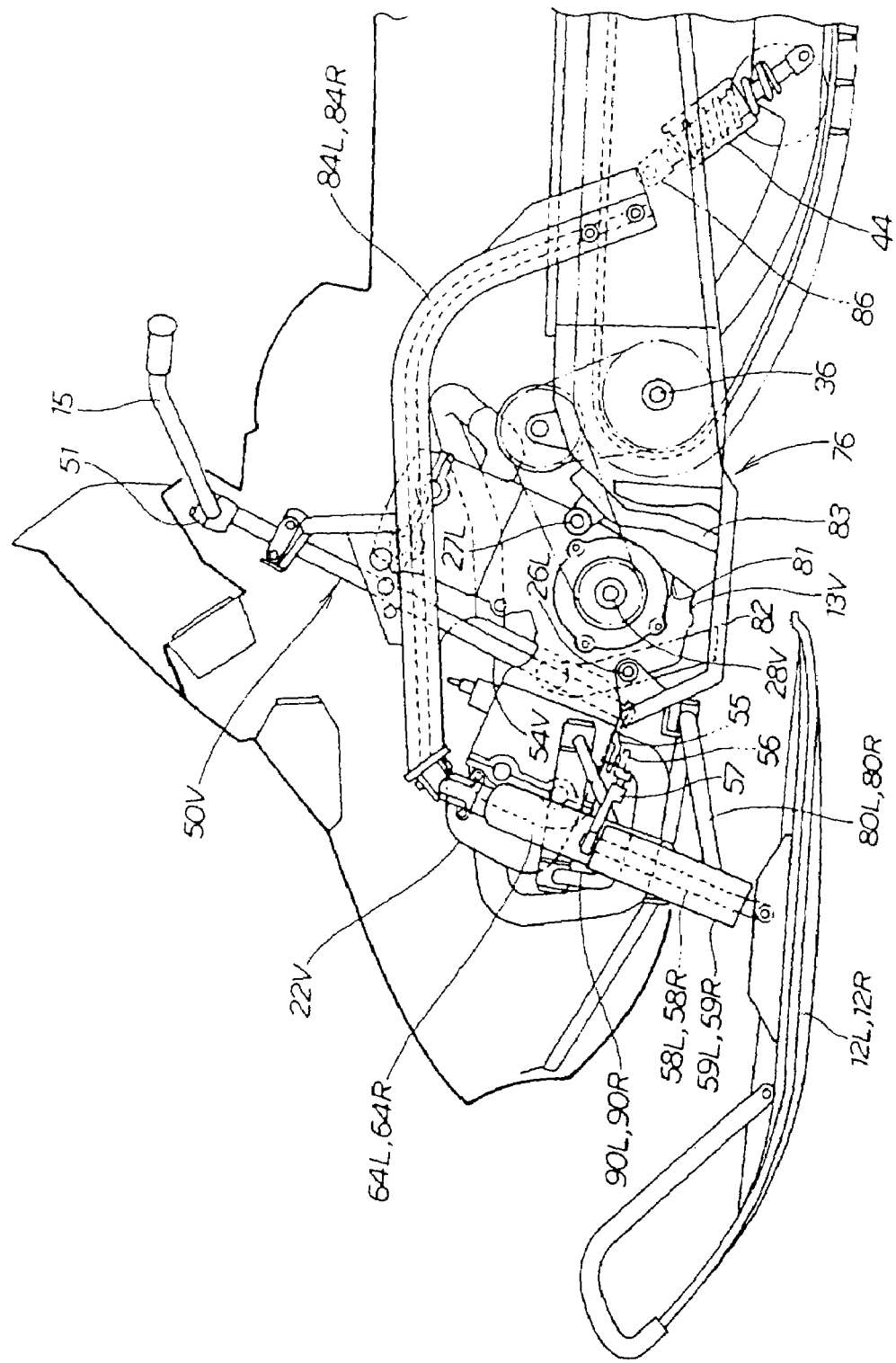
FIG. 6 is a side view of a front portion of a snowmobile according to a fourth embodiment of the present invention.

FIG. 6 is a side view of a front portion of a snowmobile according to a fourth embodiment of the present invention, and is different from the first to third embodiments in that the series type 4-cylinder engine has been replaced by a V type 2-cylinder engine.

A silencer 22V is disposed on the front side (left side) of an engine 13V, and a steering shaft lower portion 54V of a steering shaft 50V is passed between the silencer 22V and the engine 13V, and is disposed to overlap the silencer 22V.

Figure 7:
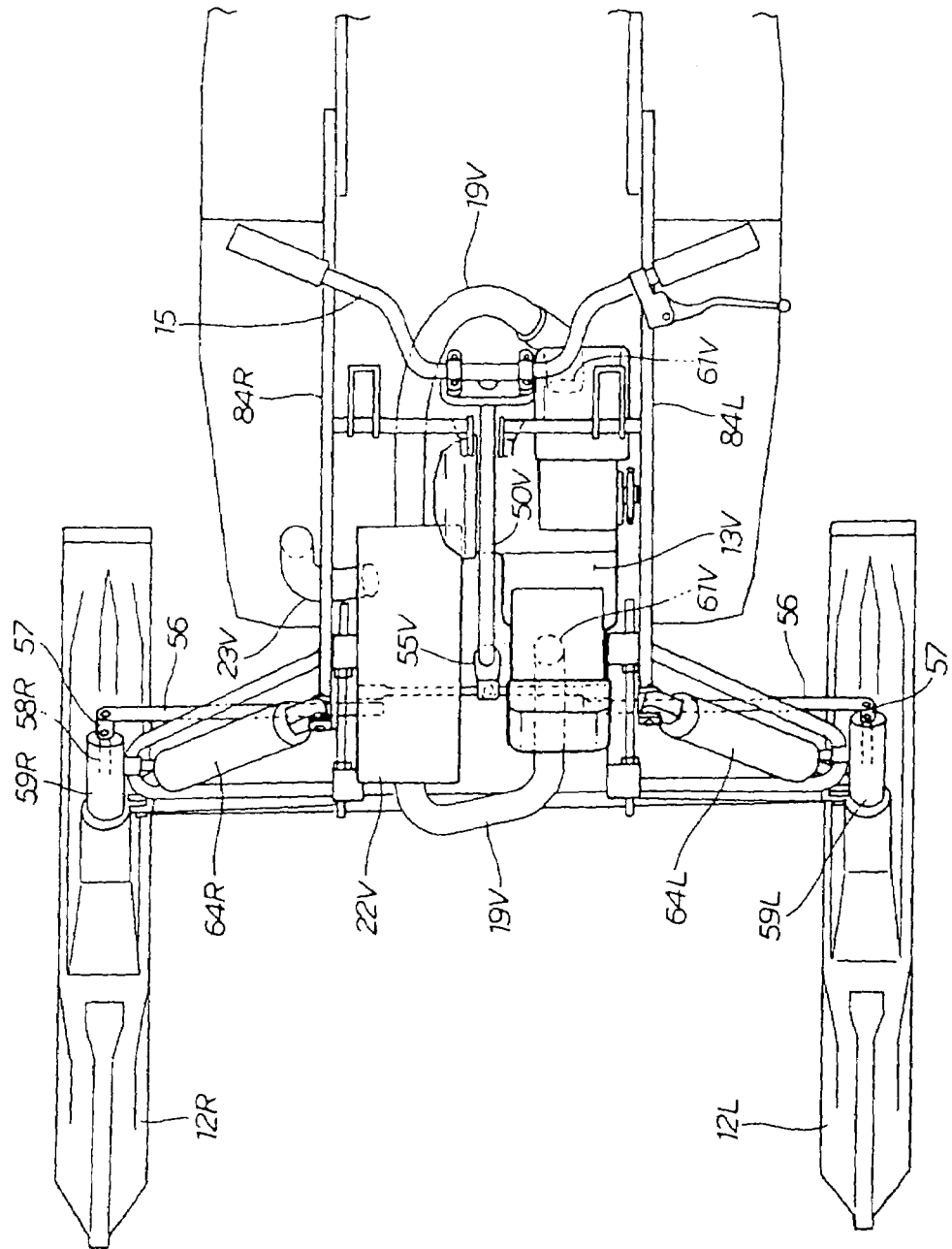
FIG. 7 is a plan view (a vehicle body cover is omitted) of a front portion of the snowmobile according to the fourth embodiment of the present invention.

FIG. 7 is a plan view (a vehicle body cover is omitted) of a front portion of the snowmobile according to the fourth embodiment of the present invention, in which the engine 13V is a 4-cycle V type 2-cylinder engine in this embodiment, and is so disposed that its crankshaft extends in the vehicle width direction and that exhaust ports 61V, 61V are directed to the front side and the rear side.

Exhaust pipes 19V, 19V are extended from the exhaust ports 61V, 61V, and are connected to a front portion and a rear portion of the silencer 22V.

In addition, the steering shaft 50V is a member which is passed between the engine 13V and the silencer 22V and attached to a lever 55V.

Since the steering shaft 50V is passed between the engine 13V and the silencer 22V, the steering shaft 50V can be laid out without any interference between the silencer 22V and the steering shaft 50V.

As a result, the steering shaft 50V can be easily laid out in the limited internal space of the snowmobile. In addition, a reduction in the length of the steering shaft 50V can be easily achieved.

Returning to FIG. 2, side frames 84L, 84R are added to a vehicle body frame 76 forming a skeleton of the vehicle body, and the portions between the upper ends of front suspensions 64L, 64R and front portions of a rear cushion 44 supporting a track belt 14 are reinforced with the side frames 84L, 84R.

Since the rigidity of the vehicle body frame 76 can be enhanced readily and effectively by only adding the side frames 84L, 84R, it is possible to cope with an increase in the engine weight without using any reinforcement members other than the side frames 84L, 84R.

Returning to FIG. 1, since the steering shaft 50 is so disposed as to overlap the silencer 22 in side view, the silencer 22 can be disposed close to the engine 13, whereby a front portion of the vehicle body can be reduced in size, and the silencer 22 can be disposed close to the center of gravity of the vehicle body.

As a result, concentration of mass can be contrived, and turning performance of the vehicle can be enhanced.

Incidentally, the steering shaft may be formed to be bendable, by adding a universal joint.

Figure 8:
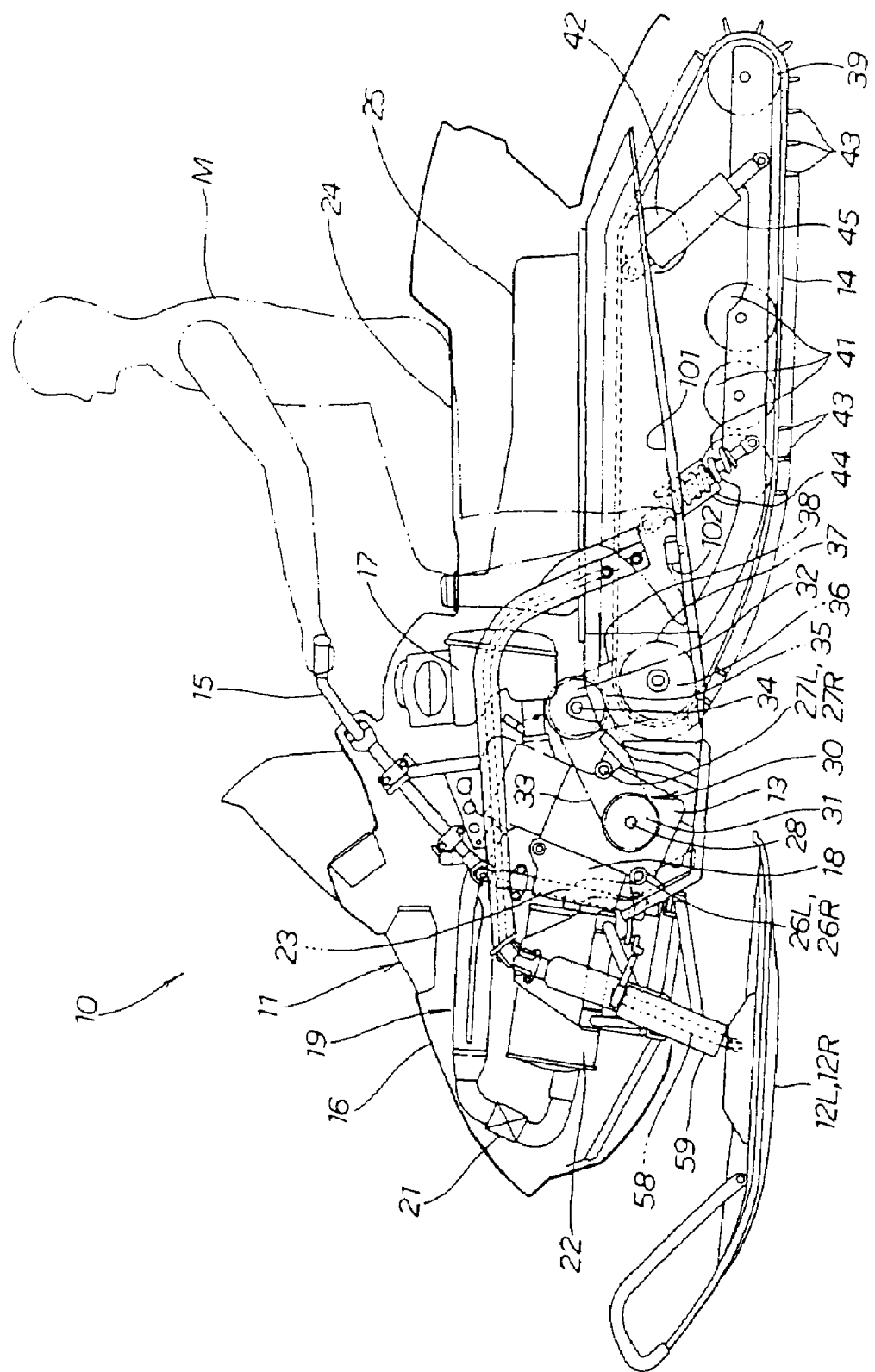
FIG. 8 is an overall side view of a snowmobile according to a fifth embodiment of the present invention.
Figure 9:
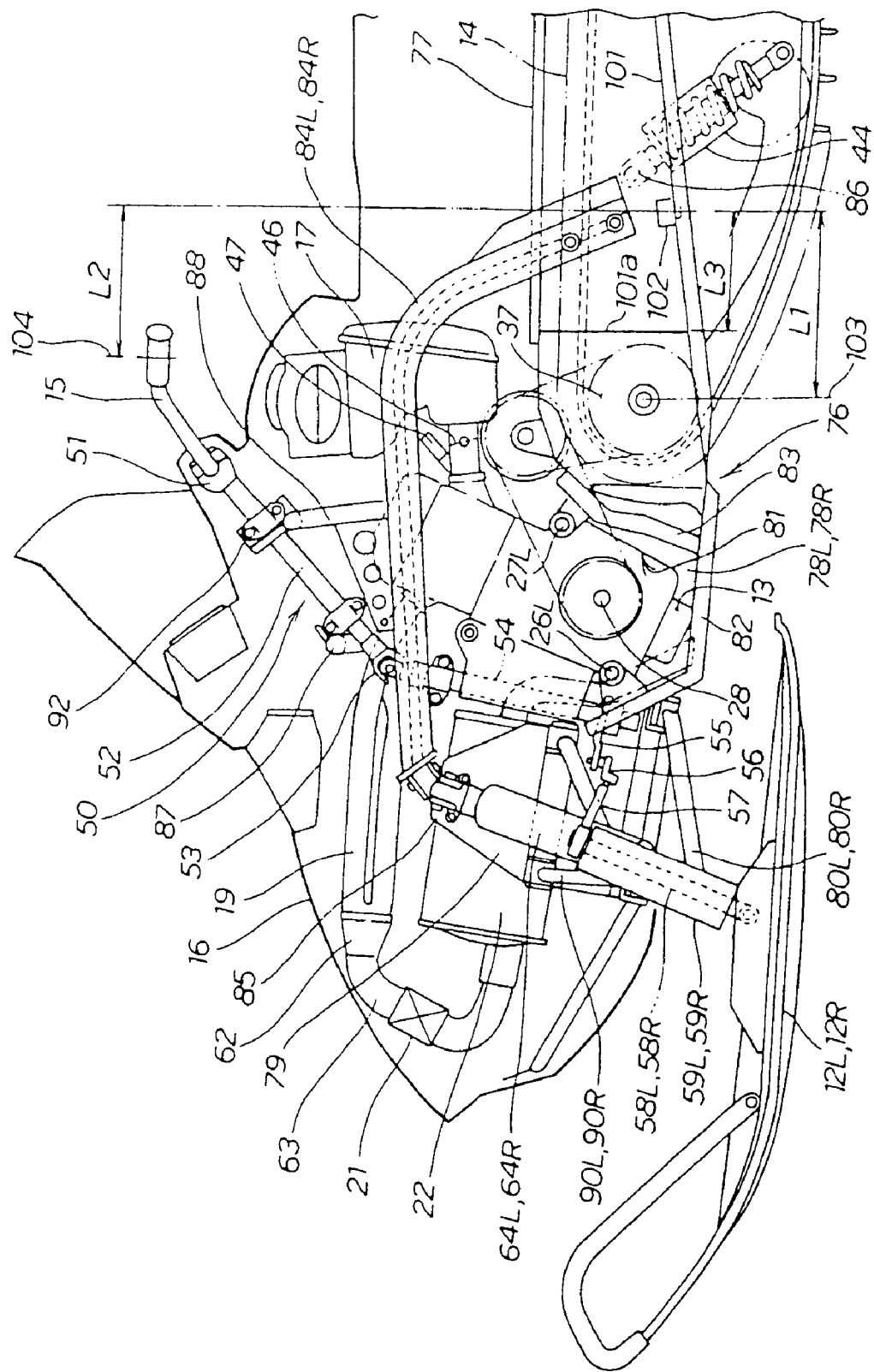
FIG. 9 is a side view of a front portion of the snowmobile according to the fifth embodiment of the present invention.

FIG. 8 provides an overall side view and FIG. 9 is a side view of a front portion of a fifth embodiment of the present invention.

Referring to FIG. 9, the positional relationship of the step bars 102 according to the present invention will be described. FIG. 9 also shows another configuration of the steering shaft 50 for connection between the steering handle and the skis 12L, 12R.

A standard of the rider herein is a person who is 174.8 cm tall and weighs 78 kg, and the numerical values given hereinafter corresponds to the case where the standard rider rises on the snowmobile.

The step bars 102 are each provided on the rear side relative to the step floor tip end 101a and within 350 mm from a track belt drive shaft 103 which is provided on the rear side of the engine 13.

In the following description, the position of the step bar 102 is the position of the center line of the step bar 102 in side view, unless specified otherwise.

In this embodiment, the spacing L1 between the step bar 102 and the track belt drive shaft 103 is set to 270 mm.

Preferably, L1 is selected in the range of 190 to 350 mm.

Where L1 is less than 190 mm, it is impossible to obviate the interference between the step bar 102 and the sprocket 37. Easy reduction of the size of the sprocket 37 for the purpose of obviating the interference is not necessarily favorable, since it needs review or redesign of the running performance and the specifications of the drive system.

On the other hand, where L1 exceeds 350 mm, the step bars 102 are located on the rear side relative to the track belt drive shaft 103, and the mass inclusive of the rider is dispersed.

Therefore, L1 is selected in the range of 190 to 350 mm.

The step bars 102 are each provided on the rear side of the step floor tip end 101a and within 290 mm from the steering handle grip center 104.

In this embodiment, the spacing L2 between the step bar 102 and the steering handle grip center 104 is set at 210 mm.

Preferably, L2 is selected in the range of 130 to 290 mm.

Where L2 is less than 130 mm, the rider's arms are bent, and the riding position is constrained to assume.

On the other hand, where L2 exceeds 290 mm, the position of the rider is on the vehicle body rear side, and the mass inclusive of the rider is dispersed.

Therefore, L2 is selected in the range of 130 to 290 mm.

The step bars 102 are each provided on the rear side relative to and within 250 mm from the step floor tip end 101a.

In this fifth embodiment, the spacing L3 between the step bar 102 and the step floor tip end 101a is set to 170 mm.

Preferably, L3 is selected in the range of 90 to 250 mm.

Where L3 is less than 90 mm, the space for putting the foot therein is small, and the rider's feet are in a constrained state, so that it is difficult to position the rider's feet on the step bars 102.

On the other hand, where L3 exceeds 250 mm, the position of the rider is on the vehicle body rear side, and the mass inclusive of the rider is dispersed.

Therefore, L3 is selected in the range of 90 to 250 mm.

Thus, in the positional relationships between the step bar 102 and the track belt drive shaft 103, between the step bar 102 and the steering handle grip center 104, and between the step bar 102 and the step floor tip end 101a, a part or the whole of these positional relationships is set within a predetermined range, whereby concentration of the vehicle body mass inclusive of the rider can be contrived.

As a result, the turning performance of the vehicle body can be enhanced.

Further as shown in FIG. 9, the steering shaft 50 is composed of a steering shaft upper portion 52 provided at its upper end with a steering handle holder 51 and inclined forwardly downwards, a universal joint 53, and a steering shaft lower portion 54 extended substantially vertically downwards from the universal joint 53.

Meanwhile, the steering shaft lower portion 54 may be contemplated to have any of two structures, namely, a structure in which it is passed on the front side of the silencer 22, and a structure in which it is passed between the silencer 22 and the engine 13.

If the steering shaft lower portion 54 is passed on the front side of the silencer 22, the steering shaft 50 as a whole has a large length. In this point, according to the present invention, the steering shaft lower portion 54 is passed between the silencer 22 and the engine 13, so that a reduction in the length of the steering shaft 50 can be easily achieved.

In addition, the fifth embodiment of FIGS. 8 and 9 (like the third embodiment shown in FIG. 5) includes a universal joint 53 interposed at an intermediate portion of the steering shaft 50, and the steering shaft lower portion 54 is disposed close to the engine 13.

When the steering shaft lower portion 54 can be disposed close to the engine 13, the silencer 22 can also be disposed close to the engine 13 accordingly. As a result, concentration of mass in the vehicle body front-rear direction can be achieved.

Figure 10:
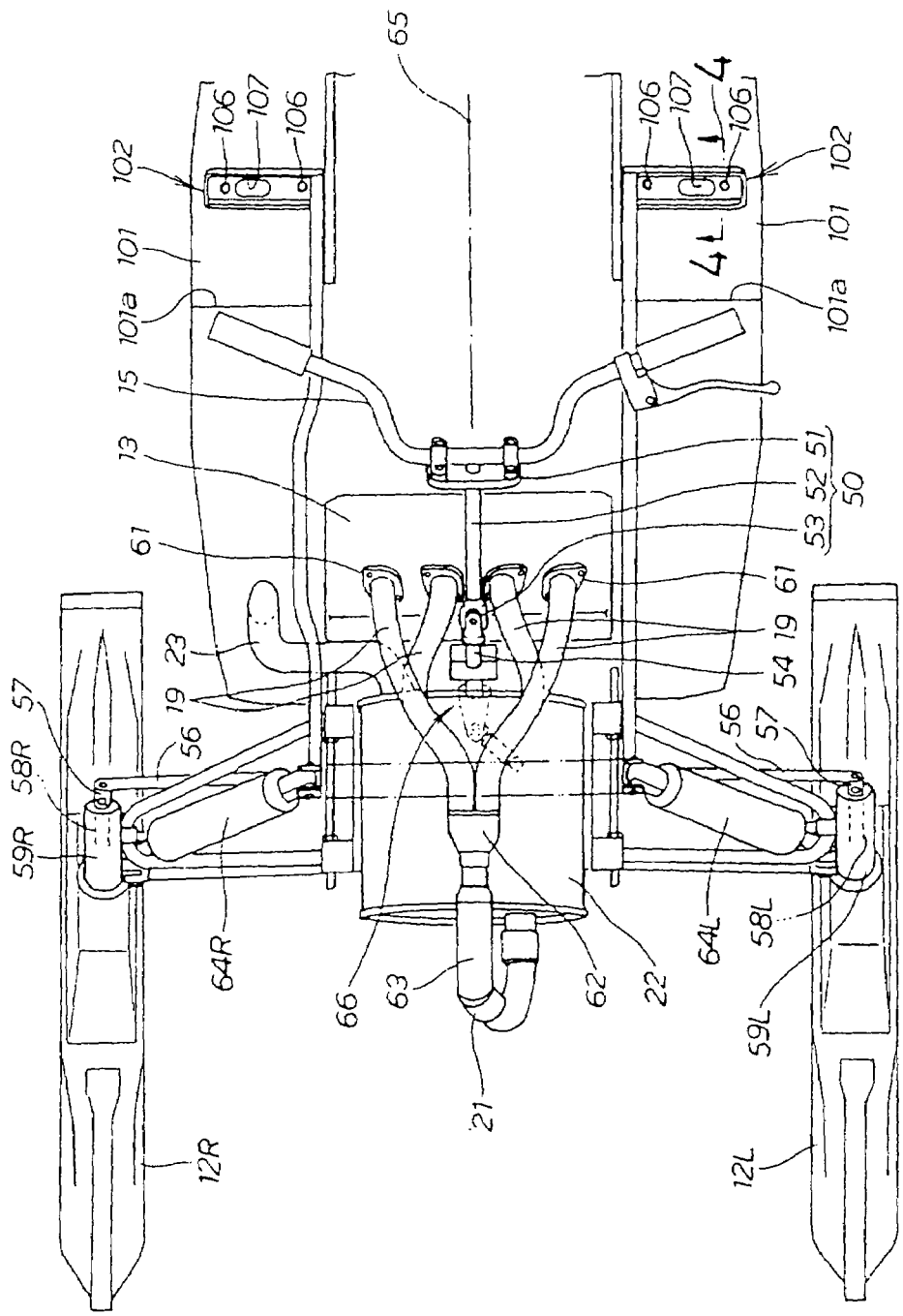
FIG. 10 is a plan view (a vehicle body cover is omitted) of a front portion of the snowmobile according to the embodiment shown in FIG. 9.
Figure 11:
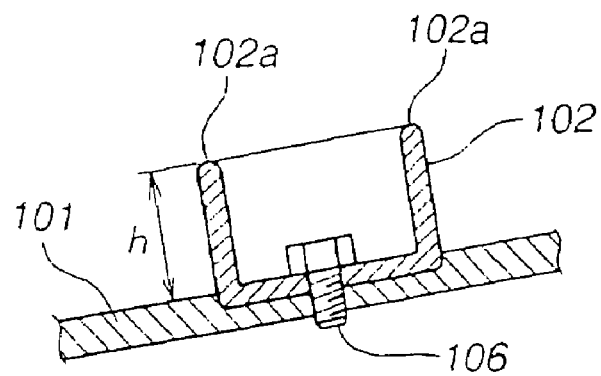
FIG. 11 is a sectional view along line 4-4 of FIG. 10.

FIG. 10 provides a plan view (the vehicle body cover is omitted) of a front portion of the snowmobile according to the embodiment shown in FIGS. 8 and 9. FIG. 11 is a sectional view along line 4-4 of FIG. 10, and shows that the step bar 102 is mounted on the step floor 101, and is fixed by a bolt 106.

The step bar 102 is a member roughly U-shaped in section and opened on the upper side.

In order to draw out snow or ice having entered into the step bar 102 from the upper side, the step bar 102 is provided on the lower side with an elliptical draw-out hole 107 (see FIG. 10). In addition, in order to secure the positioning of the foot, the upper surfaces 102a on which the rider's foot abuts is formed in a serrated shape.

Figure 12:
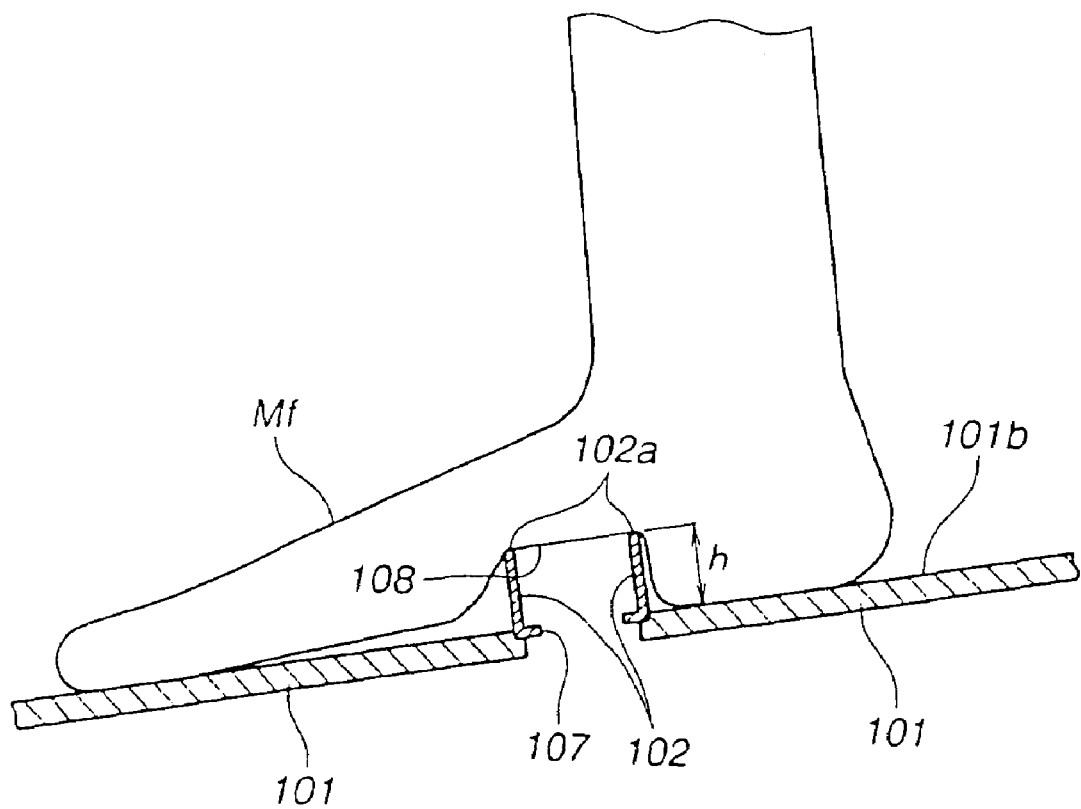
FIG. 12 is a functional diagram of a step bar.

FIG. 12 is a functional diagram of the step bar. The plantar arch of the rider's foot Mf is mounted on the upper surfaces 102a of the step bar, whereby the foot can be securely positioned on the step bar 102.

In this embodiment, the height h of the step bar 102 is so set that the heel of the rider's foot (boot) lightly touches the upper surface 101b of the step floor; however, the value of the height h may be set to be slightly larger than this setting so that the upper surface 101b of the step floor does not make contact with the heel of the rider's foot (boot).

Like the height h of the step bar 102, the width and length of the step bar 102 are not specifically limited.

By thus adding the step bars 102 to the front portions of the step floors 101 and setting the dimensions of the step bars 102 to predetermined values, it is possible to largely enhance the foot holding property.

Since the foot holding property is largely enhanced, a favorable riding position can be assumed. The positions of the feet are easily determined, even when the rider drives in a standing pose.

Incidentally, depending on the situation such as a situation of running on a flat snow field, the rider may drive the snowmobile while putting his feet on the step floors 101 without putting his feet on the step bars 102; the rider can freely select the positions of his feet.

Incidentally, the spacing between the step bar and the track belt drive shaft can be set arbitrarily. Similarly, the spacing between the step bar and the steering handle grip center and the spacing between the step bar and the step floor tip end can be set arbitrarily.

INDUSTRIAL APPLICABILITY

The present invention is suitable for application to a snowmobile which runs on a snow surface or on a snow field.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A snowmobile comprising:
   skis disposed at front portions of a vehicle body, said skis being steerable by a steering shaft;
   an engine provided at a front portion of said vehicle body; and
   a silencer provided on a front side of said engine,
   wherein said steering shaft is located so as to extend between said engine and said silencer, and to overlap said silencer when viewed in side view, and to extend between right and left exhaust pipes when viewed from above.

2. The snowmobile as set forth in claim 1, wherein said silencer is provided with a through-hole through which to pass said steering shaft.

3. The snowmobile as set forth in claim 1, wherein said silencer is provided with a recessed portion through which to pass said steering shaft.

4. The snowmobile as set forth in claim 1, wherein said steering shaft is formed in a roughly rectilinear shape.

5. The snowmobile as set forth in claim 1, wherein said steering shaft is formed to be bendable through a universal joint.

6. The snowmobile as set forth in claim 1, wherein said lower portion of the steering shaft passes between said engine and said silencer.

7. The snowmobile as set forth in claim 1, further comprising:
   a seat for seating a rider thereon provided on a rear side of said engine, and
   flat step floors provided on lateral sides of a lower portion of said seat for the rider to put his feet thereon,
   wherein step bars for enabling positioning of said rider's feet thereon are provided at front portions of said step floors.

8. The snowmobile as set forth in claim 7, wherein said step bars are each provided on the rear side relative to a front end of said step floor and within 350 mm from a track belt drive shaft provided on the rear side of said engine.

9. The snowmobile as set forth in claim 7, wherein said step bars are each provided on a rear side relative to a tip end of said step floor and within 290 mm from a steering handle grip center.

10. The snowmobile as set forth in claim 7, wherein said step floors are each provided on a rear side of and within 250 mm from a tip end of said step floor.

11. The snowmobile as set forth in claim 1, further comprising a lever extending in a rearward direction from the lower portion of the steering shaft.

12. The snowmobile as set forth in claim 1, further comprising a lever extending in a forward direction from the lower portion of the steering shaft.

13. A snowmobile comprising:
   skis disposed at front portions of a vehicle body, said skis being steerable by a steering shaft;
   an engine provided at a front portion of said vehicle body;
   a silencer provided on a front side of said engine; and
   a plurality of exhaust pipe which extend from the engine, pass in a forward direction directly above the silencer, and connect to a front side of the silencer,
   wherein said steering shaft is passed in front of said engine and behind said silencer, and is so disposed as to overlap said silencer in side view.

14. The snowmobile as set forth in claim 13, wherein said steering shaft is formed of a single linear member.

15. The snowmobile as set forth in claim 13, wherein said lower portion of the steering shaft passes between said engine and said silencer.

16. The snowmobile as set forth in claim 13, further comprising
   a seat for seating a rider thereon provided on a rear side of said engine, and
   flat step floors provided on lateral sides of a lower portion of said seat for the rider to put his feet thereon, wherein step bars for enabling positioning of said rider's feet thereon are provided at front portions of said step floors.

17. The snowmobile as set forth in claim 16, wherein said step bars are each provided on the rear side relative to a front end of said step floor and within 350 mm from a track belt drive shaft provided on the rear side of said engine.

18. The snowmobile as set forth in claim 16, wherein said step bars are each provided on a rear side relative to a tip end of said step floor and within 290 mm from a steering handle grip center.

19. The snowmobile as set forth in claim 16, wherein said step floors are each provided on a rear side of and within 250 mm from a tip end of said step floor.

20. The snowmobile as set forth in claim 13, further comprising a lever extending in a forward direction from the lower portion of the steering shaft.

* * * * *